UNITED STATES PATENT OFFICE.

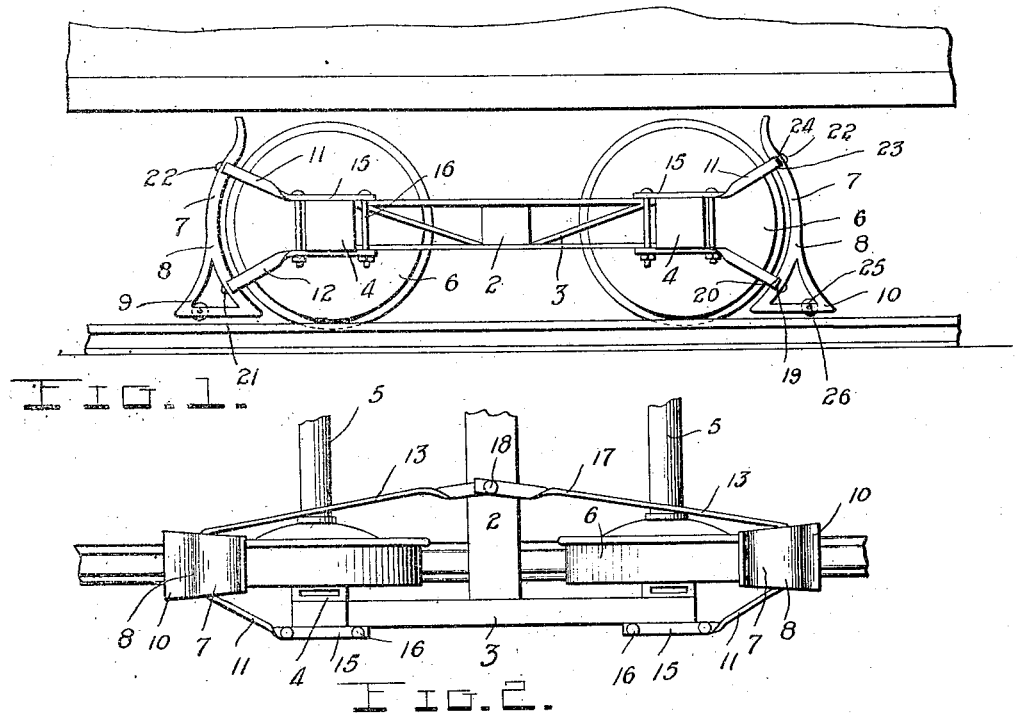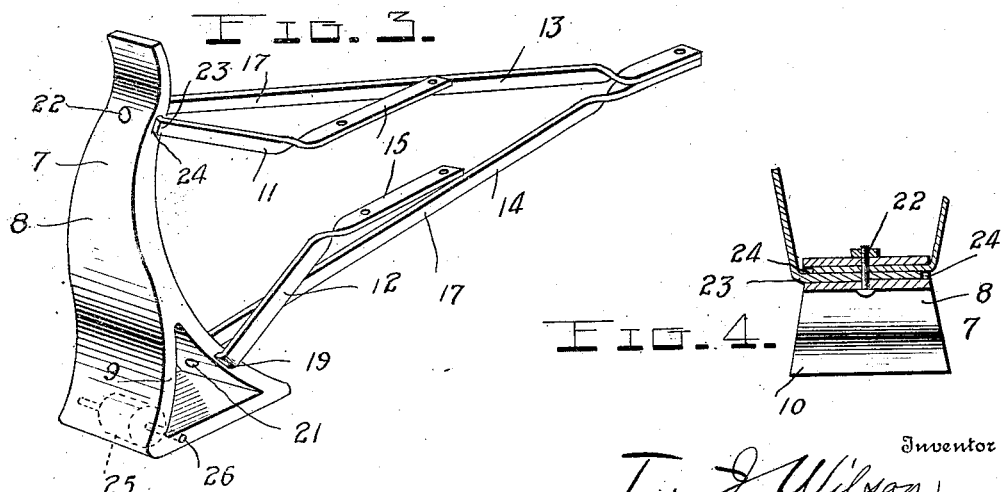

THOMAS JACK WILSON, OF QUITMAN, GEORGIA.

WHEEL-FENDER.

No. 870,072.　　　　Specification of Letters Patent.　　　Patented Nov. 5, 1907.

Application filed June 27, 1907. Serial No. 281,163.

*To all whom it may concern:*

Be it known that I, THOMAS J. WILSON, a citizen of the United States, residing at Quitman, in the county of Brooks and State of Georgia, have invented certain new and useful Improvements in Wheel-Fenders, of which the following is a specification, reference being had to the accompanying drawings.

My invention relates to improvements in fenders for the wheels of railway cars, locomotives and the like; and it consists in the novel construction and the combination and arrangement of parts hereinafter described and claimed.

The object of the invention is to provide a wheel guard or fender of this character which may be produced at a small cost and readily applied to any car truck, and which will be securely braced and supported so that it will effectively accomplish its intended purpose.

The above and other objects which will appear as the nature of the invention is better understood, are attained in the preferred embodiment of my invention illustrated in the accompanying drawings in which, Figure 1 is a side elevation of a car truck showing my improved fender applied thereto; Fig. 2 is a plan view of the parts shown in Fig. 1; Fig. 3 is a perspective view of one of the fenders and its attached supporting braces, and, Fig. 4 is a sectional view through the same taken on a horizontal plane through bolt 22.

In the drawings is shown a portion of a car truck of ordinary construction having a cross beam 2 and provided at each of its ends with a longitudinally extending end piece or frame 3 which carries the journal boxes 4 for the axles 5 of the car wheels 6.

The numeral 7 designates my improved guards or fenders and I preferably employ one for each of the wheels as shown in Fig. 1 and 2. Each of these fenders comprises a body 8, preferably but not necessarily in the form of a casting, which has its central portion curved to conform to the contour of the car wheel and its upper portion outwardly curved and terminating close to the bottom of the body of the car. The lower enlarged end 9 of the fender body is substantially triangular in shape and has a downwardly and outwardly curved outer face 10 which will serve to deflect obstructions off of the track. This lower end 9 of the body 8 may be solid but I preferably make it hollow as shown for the sake of lightness. It will be seen that by making the end 9 of triangular shape it will fill the space above the track rail immediately in front of the car wheel and prevent anything from falling upon the track between the fender and wheel.

The fender body 8 is rigidly supported in position with its curved portion spaced from the wheel and the flat bottom of its lower end spaced above but close to the track rail, by two outer braces 11, 12 and two inner braces 13, 14. The outer braces 11, 12 are in the form of angular bars of metal and have their parallel ends 15 secured by bolts or similar fastenings 16 to the lower and upper faces of one of the journal boxes 4. The inner braces 13, 14 are also in the form of metal bars which receive one of the axles 5 between them and have their converging ends 17 superposed and formed with alined apertures to receive a bolt or similar fastening 18 which secures them to the main cross beam 2 of the track.

When one of the fenders is arranged upon each of the wheels of the track, the ends 17 may all be united to the beam 2 by the same fastening 18, as shown in Fig. 2. The two lower braces 12, 14 are united to the lower end 9 of the fender body by bending their outer ends inwardly at right angles, as shown at 19, and inserting them in a transverse slot 20 formed in said portion of the body as seen in Fig. 4. Said ends 19 of the braces are, of course inserted from opposite sides of the fender and they are formed with alined apertures adapted to receive a fastening bolt or the like 21 which retains them in the transverse slot 20. The upper braces 11, 13 are similarly secured in the upper curved portion of the fender body by a bolt or the like 22 which is passed through alined apertures in the right angularly bent ends 23 of said braces, which ends are inserted in a transverse slot 24 in the body 8.

In order to prevent any possibility of the body 8 causing the derailment of the car wheel should the braces bend or break when the fender strikes a heavy obstruction I preferably arrange a roller 25 in a slot portion of the bottom of the body so that when the latter lowers the roller will run upon the track rail. These rollers 25 are journaled upon bolts or shafts 26 and are normally out of contact with the track rails.

From the foregoing it will be seen that a fender constructed and mounted in accordance with my invention, will have its body rigidly supported upon both the outer and inner sides of the wheel and hence will not be liable to be easily broken or damaged. The inner and outer parts of the upper and lower braces not only serve to effectively support the body 8 but also serve as guards for the wheels and further provide rigid supports which may be grasped by a person who falls beneath the car.

The use of this fender will make it practically impossible for a person to be run over by a car wheel, since the curved upper end of the body will prevent a person from passing over the top of the wheel and the outwardly curved lower end 10 will serve to throw or deflect the body off of the track rail.

If desired the front face of the body of the fender may be oval or rounded instead of flat so as to reduce the liability of the fender maiming or injuring a person caught by a fender.

Having thus described my invention what I claim is:

1. The combination with a truck having a central cross beam, axles, and journal boxes arranged to receive the outer ends of the axles and carried by said beam, of a pair of wheel fenders each having a body spaced from the outer edges of the wheels upon the axles, upper and lower outside braces having their outer ends connected to the outside portions of the fender bodies and their inner ends engaged with and secured to the top and bottom faces of said journal boxes, upper and lower inside braces having their outer ends connected to the inner edges of said fender bodies and their inner ends united and engaged with said cross beam of the truck and a fastening for uniting the inner ends of said inside braces to said cross beam, substantially as described.

2. The combination with a car truck, of a wheel fender supported from the truck in advance of one of its wheels, said fender having a substantial vertically disposed body provided with a central portion curved to conform to the curvature of the wheel, an outwardly curved upper end terminating close to the body of the car to prevent anything from being drawn up by the wheel between it and the car body, said fender also having a substantially triangular shaped lower end with an outwardly curved front face, substantially as and for the purpose set forth.

3. A wheel fender comprising a body formed with a transverse slot, inner and outer attaching braces having angular ends to enter said slot in the body from opposite sides of the latter and a fastening to retain said angular ends of the braces in the said slot substantially, as described.

4. The herein described wheel fender comprising a body having a central portion curved to conform to the contour of a wheel and an upwardly and outwardly curved upper end, the lower end of said body being triangular in shape and having a downwardly and outwardly curved outer face, the outer pair of angular attaching and supporting braces having their inner ends disposed in parallel relation in horizontal planes and apertured for attachment to a journal box and their outer portion twisted into vertical planes and arranged in diverging relation with their extremities attached to the upper and lower portions of the body, and the inner pair of angular supporting and attaching braces arranged in converging relation with their outer ends attached to the upper and lower portions of the body and their inner ends twisted into horizontal planes and in contact with each other and apertured to receive a fastening to secure them to the truck, substantially as described.

5. A wheel fender comprising a body curved to conform to the contour of a wheel and having a triangular shaped lower end, the latter being hollow and formed in its bottom with an opening, a pivoted pin arranged in the bottom and across said opening, a roller journaled upon said pin and means for supporting said body in advance of a wheel and with its roller out of contact with the track, substantially as described.

In testimony whereof I hereunto affix my signature in the presence of two witnesses.

TOM JACK WILSON.

Witnesses:
JOHN H. MASHBURNE.
JOHN H. HUNTER.